US010516744B2

United States Patent
Lu et al.

(10) Patent No.: US 10,516,744 B2
(45) Date of Patent: Dec. 24, 2019

(54) METHOD OF FILTERING APPLICATIONS (71) Applicant: Alcatel Lucent, Boulogne Billancourt (FR)

(72) Inventors: Monique Lu, Nozay (FR); Eric Joubert, Nozay (FR)

(73) Assignee: Alcatel Lucent, Nozay (FR)

( * ) Notice: Subject to any disclaimer, the term of this patent is extended or adjusted under 35 U.S.C. 154(b) by 211 days.

(21) Appl. No.: 14/383,771

(22) PCT Filed: Feb. 28, 2013

(86) PCT No.: PCT/EP2013/054039
§ 371 (c)(1),
(2) Date: Sep. 8, 2014

(87) PCT Pub. No.: WO2013/131801
PCT Pub. Date: Sep. 12, 2013

(65) Prior Publication Data
US 2015/0106524 A1    Apr. 16, 2015

(30) Foreign Application Priority Data
Mar. 9, 2012    (EP) .................................... 12158874

(51) Int. Cl.
*H04L 29/08* (2006.01)
*H04W 4/50* (2018.01)
(52) U.S. Cl.
CPC .............. *H04L 67/16* (2013.01); *H04L 67/34* (2013.01); *H04W 4/50* (2018.02); *H04L 67/18* (2013.01); *H04L 67/306* (2013.01)
(58) Field of Classification Search
CPC ......... H04L 67/16; H04L 67/34; H04L 67/18; H04L 67/306; H04W 4/001
See application file for complete search history.

(56) References Cited

U.S. PATENT DOCUMENTS

2003/0043763 A1*    3/2003    Grayson ............... H04L 1/1867
370/329
2003/0169294 A1*    9/2003    Vatula ................... G06F 9/4443
715/764

(Continued)

FOREIGN PATENT DOCUMENTS

CN    101346974    1/2009
CN    101951549    1/2011

(Continued)

OTHER PUBLICATIONS

E. Kaasinen et al., "Ambient Functionality—Use Cases," ACM International Conference Proceeding Series—Proceedings of the 2005 Joint Conference on Smart Objects and Ambient Intelligence: Innovative Context-Aware services: Usages and Technologies, vol. 121, pp. 51-56, XP002676167, Oct. 2005.

(Continued)

*Primary Examiner* — Clayton R Williams
*Assistant Examiner* — Tania M Pena-Santana
(74) *Attorney, Agent, or Firm* — Fay Sharpe LLP (57) ABSTRACT

A method of configuring a graphical user interface in a computing device, the device comprising a collection of applications (14), wherein the computing device is connected to a network, the method comprising: determining (16) for each application a list of services required by the application to be executed, determining (18) a collection of available resources as the resources able to be accessed by the computing device through the network, a resources being able to provide a service, comparing (15) the list of services required by each application with the services provided by the collection of available resources so as to find a match for each required service of the list of the said application within the collection of available resources, and generating (24) a list of operational applications, an operational application being an application for which each (Continued)

required service has a match provided by the available resources.

10 Claims, 2 Drawing Sheets

(56) References Cited

U.S. PATENT DOCUMENTS

| | | | | |
|---|---|---|---|---|
| 2006/0213991 | A1* | 9/2006 | Koizumi | G06Q 20/105 235/451 |
| 2007/0093258 | A1* | 4/2007 | Steenstra | H04W 4/18 455/456.5 |
| 2008/0271123 | A1* | 10/2008 | Ollis | G08C 17/02 726/4 |
| 2010/0107150 | A1* | 4/2010 | Kamada | G06F 8/65 717/170 |
| 2010/0146442 | A1 | 6/2010 | Nagasaka et al. | |
| 2011/0047214 | A1* | 2/2011 | Lee | H04L 12/2809 709/204 |
| 2011/0212702 | A1 | 9/2011 | Howard et al. | |
| 2012/0146918 | A1* | 6/2012 | Kreiner | H04M 1/7253 345/173 |
| 2012/0284256 | A1* | 11/2012 | Mahajan | G06F 8/61 707/722 |
| 2013/0052946 | A1* | 2/2013 | Chatterjee | H04W 4/80 455/41.1 |
| 2014/0149217 | A1 | 5/2014 | Steenstra et al. | |

FOREIGN PATENT DOCUMENTS

| | | |
|---|---|---|
| CN | 102360364 | 2/2012 |
| JP | 2002-073436 | 3/2002 |
| JP | 2008-306667 | 12/2008 |
| JP | 2011-160145 | 8/2011 |
| WO | WO 2007/051131 A1 | 5/2007 |
| WO | WO 2010/142345 A1 | 12/2010 |
| WO | WO 2011/082099 | 7/2011 |

OTHER PUBLICATIONS

International Search Report for PCT/EP2013/054039 dated Apr. 4, 2013.

* cited by examiner

METHOD OF FILTERING APPLICATIONS

FIELD OF THE INVENTION

The invention relates to the technical field of systems and methods for selecting and/or recommending applications to the user of a computing device connected to a network, more particularly applications running with services provided by connected resources, such as, for instance, recommendation systems used on a mobile phone connected to the Internet to recommend applications to a user.

BACKGROUND

Due to developments of the World Wide Web, the number of resources exposed on the web has been growing rapidly. The number of applications using resources connected to the Internet is following this trend. Accordingly, the number of applications using these resources proposed to the users through their computing devices such as smart phones or computers is significantly increasing.

Therefore, it becomes more and more essential to be able to recommend the relevant applications to the users of such computing devices, so that the user is able to retrieve quickly the relevant application needed and execute it in an efficient manner. In this context, it is important to be able to structure and determine the relevancy of applications.

SUMMARY

In an embodiment, the invention provides a method of filtering executable applications in a computing device, the device comprising a memory and a collection of executable applications stored in the memory,
wherein the computing-device is connected to a network, the method comprising the steps of:
  determining for each application of the collection of applications a list of services required by the respective application to be executed by the user,
  retrieving a collection of available resources of the network as the resources able to be accessed by the user-device through the network, a resources being able to provide a service,
  comparing the list of services required by each application with the services provided by the collection of available resources so as to find a match for each required service of the list of the said application within the services provided by the collection of available resources, and
  generating a list of operational applications, wherein an operational application is an application for which each required service has a match in the services provided by the collection of available resources.

According to embodiments, such computer implemented method can comprise one or more of the features below.

In the step of retrieving the collection of available resources, parameters of the computing device and/or the user may be taken into account. In embodiments of the method, the collection of available resources is retrieved as a function of a user identifier.

In embodiments of the method, the method further comprises a step of determining the position of the computing device, and the collection of available resources is retrieved as a function of the position of the computing device.

In embodiments of the method, the method further comprise the steps of: computing a relevancy score for each operational application of the list of operational applications, ranking the list of operational application according to the relevancy scores, the operational applications corresponding to the highest relevancy scores being set at the top of the list. In embodiments of the method, the retrieval of the collection of available resources comprises retrieving a description for each available resource, the description comprising individual indications representing properties of the associated available resource, the step of computing a relevancy score being further made as a function of said individual indications of the available resource.

In embodiments of the method, the individual indications comprise at least one indication selected among location indications representing the location of the available resource, ownership indications representing the ownership of the resource, status indications representing the operational status of the resource and usability indications representing the usability of the resource.

In embodiments of the method, the method further comprises a step of accessing a user preferences rule,
the user preferences rule representing the preference of a user for a preferred value associated to an indication of said individual indications, the step of computing a relevancy score further being made as a function of the user preferences rule so that an operational application, associated to the preferred value, has a higher score than an operational application not associated to the preferred value.

In embodiments of the method, the computing device comprises a graphical user interface and the method further comprises a step of configuring graphical elements of the graphical user interface adapted to control execution of the applications as a function of the list of operational applications.

In embodiments of the method, the step of configuring the graphical element comprises a step of displaying the operational applications of the list of operational applications as graphical elements adapted each one to execute a respective operational application.

In embodiments of the method, the configuration of the graphical element of the graphical user interface is further made as a function of the computed relevancy scores, and the graphical elements are displayed according to the relevancy score of their respective operational application.

In embodiments of the method, the step of comparing the list of services required by the application with the collection of available resources further comprises a step of finding one resource providing a required service or combining at least two available resources to find a match for one required service of the list of required services.

In embodiments of the method, the method further comprises a step of determining a combined resources number as the number of resources combined to provide said required service of the said application, and the step of computing a relevancy score is made as a function of the combined resources number so that an operational application, for which the combined resources number is equal to one, has a higher relevancy score than an operational application having a combined resources number higher than one.

In embodiments of the method, the retrieval of the collection of available resources comprises retrieving a description for each resource of the list of available resources, the description of the resource comprising a service indication which represents a service which can be provided by the said resource,
the step of comparing the services comprising a step of analyzing the description of the available resource so as to identify the services which can be provided.

In embodiments of the method, the memory comprises an original set of applications including the collection of applications, the method further comprising a step of pre-filtering the original set of applications so as to obtain the collection of applications, the step of pre-filtering being made as a function of context information determined by the computing device.

In embodiments, the invention also provides a computer program comprising computer-executable instructions that cause a computing device to execute any one of the above mentioned methods.

In embodiments, the invention also provides a computing device comprising the said computer program.

In embodiments, the invention also provides a server for a communication network, the server comprising
a data repository storing a directory of resources, the directory of resources comprising a position indication and an accessibility indication for each resource of a collection of resources connected to the communication network,
a control unit adapted to:
compare a position information relating to a computing device connected to the communication network and a user identifier respectively to the position indication and the accessibility indication of each resource of the collection of resources and
select a subset of the collection of resources as a function of the position and accessibility comparison,
and a communication unit adapted to receive the position information and the user identifier from the computing device and transmitting the selected subset of the resources to the computing device.

The invention originates from the observation that in the context of mobile devices comprising applications, the applications operability depends on the availability of services the applications require. The invention also originates from the observation that the availability of a service depends on the presence of a physical resource providing the said service in the environment of the user.

Therefore, an idea on which the invention is based consists in filtering applications as a function of operational applications, the operational applications being determined as a function of the availability in the user environment of the services the applications require.

Aspects of the invention are based on the idea of determining the operational applications by comparing the available resources in the user environment to the required services, and finding matches between the available resources and the required services so as to fulfill all required services of an application.

Aspects of the invention are based on the idea of calculating a relevancy of operational applications, which are associated to matching resources, on the basis of additional data specific to each of the matching resources.

Aspects of the invention are based on the idea of calculating the relevancy score as a function of individual properties in the additional data of the matching resources, and balance the relevancy score using preferences defined by the user in relation to the value of one of the properties.

BRIEF DESCRIPTION OF THE DRAWINGS

These and other aspects of the invention will be apparent from and elucidated with reference to the embodiments described hereinafter, by way of example, with reference to the drawings.

FIGS. 4 and 5 represent the GUI when the method is executed in two different places corresponding respectively to the user's home and the user's workplace.

DETAILED DESCRIPTION OF THE EMBODIMENTS

Figure 1:
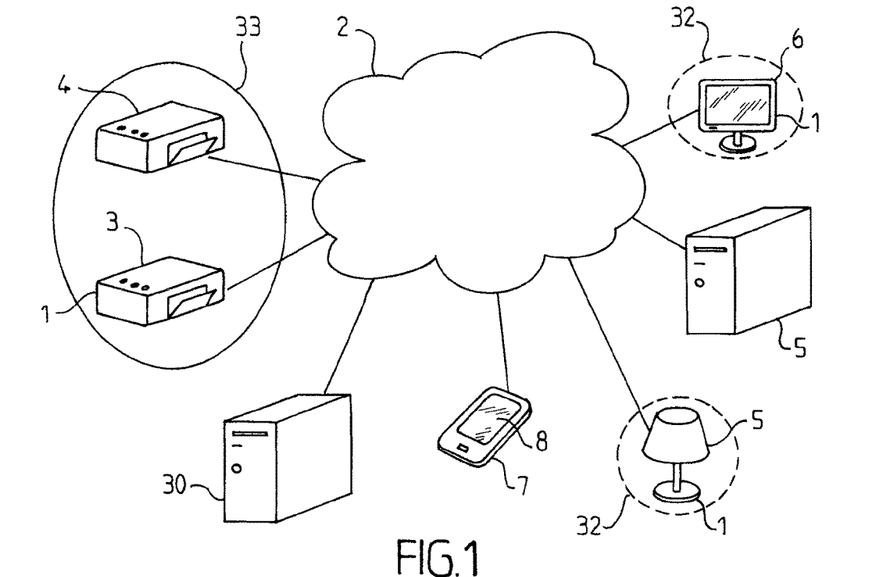
FIG. 1 is a schematic representation of connected resources interconnected through the Internet network.

FIG. 1 shows an example of a set of connected resources 1, which are interconnected through the internet network 2. More precisely, two printers 3 and 4, a lamp 5, a distant server 6, a framework server 30, and a video screen 6 are interconnected, as well as a mobile phone 7. Any other types of connected resources may be connected to the internet network 2.

Figure 4:
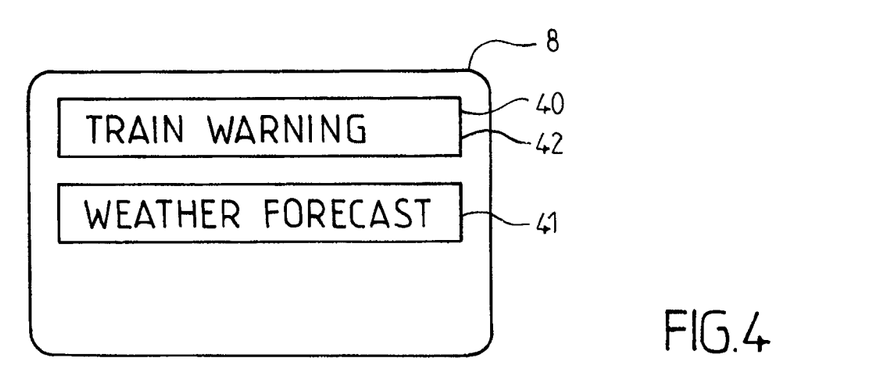
FIGS. 4 and 5 are schematic representations of a graphical user interface (GUI) displayed on the screen of the mobile device when the method represented in FIG. 2 is executed.
Figure 5:
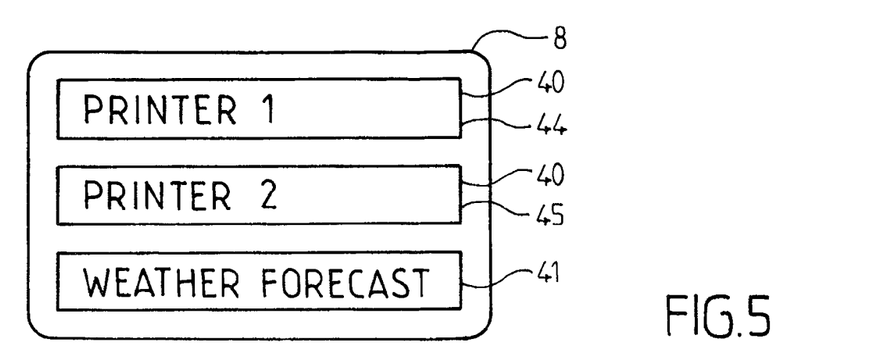

The mobile phone 7 comprises data storage in which a plurality of applications is stored. A graphical user interface (GUI) displays, on a screen 8 of the mobile phone 7, a selection of applications, which are recommended to the user by a recommendation system 9. FIGS. 4 and 5 illustrate examples of displayed icons in two situations. The two situations are respectively when the user, who owns the mobile phone 7, is with his mobile phone 7 at his home, and when the user is at his workplace. The recommended applications are represented on the screen as icons 40 each corresponding to one recommended application. Each application recommended to the user is fully operational. Furthermore, the icons 40 are listed according to the relevancy of the applications, the most relevant starting at the top of the screen 8. The user is then able to execute a specific application by activating the associated icon within the GUI of the mobile phone 7.

However, the GUI may present the recommended applications to the user by any other way in a sense that allows the user to understand which applications are the most relevant. For instance, the GUI may highlight the recommended application in a list comprising all the application of the mobile phone.

The applications comprise traditional applications and World of Things (WoT) applications.

The traditional applications may be executed anywhere as they do not need connected resources, which availability depends on the user's 25 environment. For instance, a traditional application may consist in a weather forecast application 41 which shows the weather forecast as a function of the position of the mobile phone 7. To this end, the weather forecast application 41 needs the position of the mobile phone 7, which is provided by a geo-localization module in the mobile phone 7 and a weather information feed. The weather information feed is provided by a distant server 5 and is always accessible to the mobile phone 7 as long as it is connected to the network 2 whatever the environment of the user 7 is.

The user environment is determined by the location of the mobile phone 7. The location is identified as a function of the latitude and longitude coordinates indicated by a GPS receiver associated to the mobile phone 7. However, the location may also be defined by another type of localization such as a logical reference to a place where the user can be localized. Such localization to a place can be implicit or explicit.

An implicit localization may be, for instance, provided by associating a specific logical localization reference to a cell, e.g. a femtocell comprised in a wireless network. A femtocell is a small cellular base station connected to the network and able to support active mobile phone connections in a certain range. When the mobile phone is connected to this specific femtocell, which means the mobile phone 7 is the said range of the femtocell, the location data is set to the logical reference associated to the femtocell.

An explicit localization could consist in the user 25 running a localization application. In this application, the user 25 indicates on a map where he is currently localized.

The logical reference may be for instance "at home" or "at the office".

In contrast to the traditional application, in order to fulfill their tasks, the WoT applications use resources which may or may not be available depending on the position of the mobile phone 7. More precisely, the WoT applications use connected resources corresponding to physical objects, each associated to a specific location. If the mobile phone 7 is too far from a physical object, the associated resource is not available for the WoT applications and therefore the WoT applications are not able to operate if no other resource is available to replace the unavailable resource.

In the network illustrated in FIG. 1, the lamp 1 and the screen 6 correspond to physical objects present at the user's 25 home and therefore are encircled by the doted circle 32. The printers 3 and 4 correspond to resources provided by physical objects at the user's 25 workplace. The workplace is represented in FIG. 1 by the continuous encirclement 33.

An example of a WoT application is a Train Warning application. When the Train Warning application is launched by the user 25, it informs the user 25 when a train is approaching a specific train station. In order to inform the user 25, the application controls a connected resource 1, which is a physical object in the user environment and comprises a visual device to have it blink when a train is going to arrive at the train station in less than 5 minutes.

For that purpose, the Train Warning application needs two resources. The first resource is a traffic information feed. The traffic feed consists in a data stream comprising information about the train traffic provided by a distant server 5. The second resource required is a physical object which comprises a blinking service. This service may be provided, for instance, by the lamp 5 thanks to an internal module in the lamp 5 that can be activated to make the lamp blink. The internal module typically comprises a control switch and a communication interface to receive control instruction trough a wired or wireless link.

However, if no lamp 5 or other connected resource can provide the service of blinking in the user environment, the Train Warning application cannot fulfill its task. Therefore, the application would not be operational.

As some applications may not be operational depending on the user environment, the GUI of the mobile phone 7 recommends and displays to the user 25 only applications which can fulfill their task. More precisely, the GUI displays a selection of icons in which each icon corresponds to an operational application. Moreover, the icons are displayed in an order corresponding to their relevancy.

Figure 3:
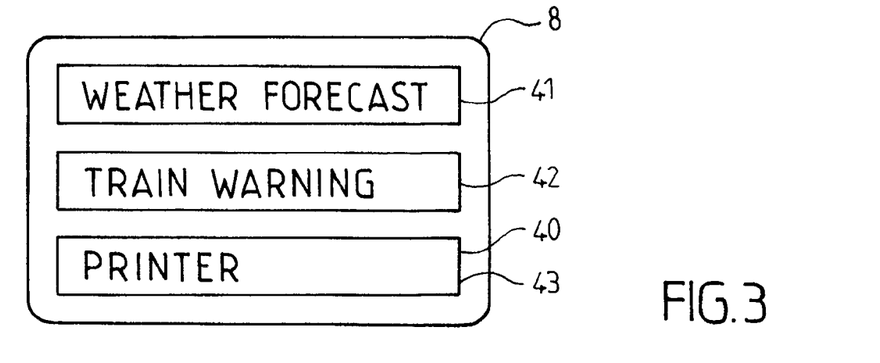
FIG. 3 is a schematic representation of a graphical user interface displayed on the screen of a mobile device when the method represented in FIG. 2 is not executed.

This aspect is illustrated in FIGS. 3 to 5. FIG. 3 corresponds to a GUI which displays the application icons 41, 42, 43 whatever the operational or non operational status of application. Therefore, all above mentioned applications and further a printer application are displayed by the respective icons 41, 42, 43. The printer application is an application using the services of any local printer.

FIGS. 4 and 5 illustrate the displayed application icons when the GUI displays only applications which can fulfill their tasks. More precisely, in FIG. 4, the user is at home and therefore a lamp 5 is available for the train warning application. Therefore, this application icon 40 is displayed contrarily to the printer application for which no local printer is available at the user's home.

In FIG. 5, the user is at his workplace. Therefore the two printers 3 and 4 are available contrarily to the lamp 5. Therefore, two printer application icons 44 and 45 are displayed and correspond each to the printer application respectively associated to the resources of the first printer 3 and the second printer 4.

Moreover, as the weather application is always available, the GUI illustrated on FIGS. 4 and 5 display the weather forecast application icons 41 as well.

For the purpose of displaying to the user 25 only applications which can fulfill their task, the mobile phone 7 comprises a recommendation engine 11 and a WoT recommendation module 12 which determine and provide to the GUI the operational applications and the relevancy of the operational applications.

Figure 2:
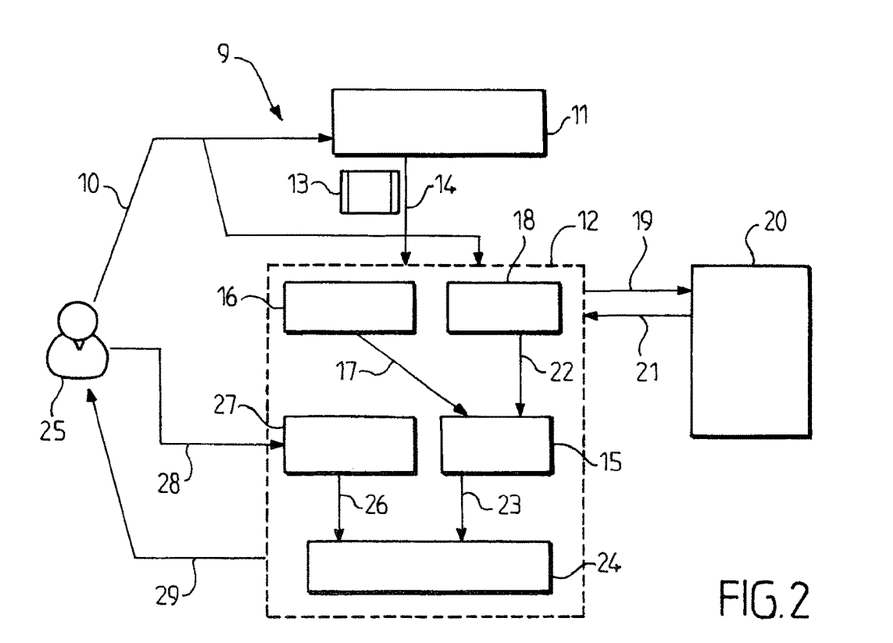
FIG. 2 is a flow diagram showing an embodiment of a method according to the invention which may be applied on a cell-phone connected on the Internet network presented in FIG. 1

The functioning of the recommendation engine 11 and the WoT recommendation module 12 will now be described in reference to FIG. 2.

When the user uses the mobile phone 7, the recommendation engine 11 accesses to context data 10 stored in the mobile phone 7. Context data could comprise the position of the mobile phone 7, the time, the current activity of the user and the planning of the user 25.

The recommendation engine 11 accesses a database of applications 13 in the data storage of the mobile phone 7 and selects applications 15 to be recommended among this database according to the context data. For instance, if the GPS coordinates correspond to the user's home, applications relating to leisure will be most likely selected. If the GPS coordinates of the mobile phone 7 correspond to the user's workplace, applications related to his work such as "employees Directory", "Meeting reservation", "Printer" applications will be most likely selected. For that purpose, the mobile phone comprises predefined user contexts such as "at home", "at office" which are associated to a set of applications and a specific range of GPS coordinates. Other kinds of predefined user contexts may be used. For instance, predefined contexts such as the city in which the user is located may be used: "in Paris", or "in New York". Other types of contexts may be used or combined with the location context. For instance a time context may be taken into account to determine the relevancy of the application and may comprise "in the morning", "at lunch time", "in the evening". When different types of context are taken into account in the determination of the relevancy, the different types of contexts may be balanced with weighting coefficients.

The selected applications are stored in a first list of applications, and the recommendation engine 11 provides the first list of applications 14 to the WoT recommendation module 12. Furthermore, the WoT recommendation module 12 accesses to the context data in order to get the location of the mobile phone 7.

With the location of the mobile phone 7 and the first list of application, the WoT recommendation module 12 selects the applications 15 which are operational.

For that purpose, an application analyzer 16 analyses the applications of the first list and determines the services required for each application in order to fulfill its task.

To that end, the database 13 provided in the data storage comprises a semantic description of each application in which the properties of the respective application are identified. An XML semantic description of the above mentioned Train Warning application is shown below in appendix 1.

In this semantic description, "HasInput" tags identify the resources required by the Train Warning application. More precisely, the first "HasInput" tag indicates that the application needs a traffic feed "WoT_connected_traffic_feed", and the second "HasInput" tag indicates that the application requires a physical visual connected resource in the user environment that comprises a service for blinking. The service is identified by the "hasService" tag.

By identifying the tags, the application analyzer 16 determines the services required by each application in order to be operational and which need to be supported by physical resource in the user environment. The application analyzer 16 then generates a list of the required services for each application of the first list. The list of required services is sent 17 to a resources checker 15.

The Wot recommendation module 12 further comprises a Resource getting module 18. At the same time as the application analysis 16, the resources getting module 18 sends the coordinates 19 of the mobile phone 7 and an user identifier to an external WoT framework module 20 running in the framework 30. The user identifier may consist in an identifier associated to the mobile phone 7, login data that the user has entered on the mobile phone or any other information that may identify the user or the mobile phone 7.

The WoT framework module 20 generates a list of all available resources in the user environment according to the coordinates and the user identifier transmitted by the resources getting module 18 and transmit it to the resource getting module 18.

To this end the Wot Framework 20 comprises a list of the connected resources in the network 2. The connected resources are associated to spaces. The two printers 3 and 4 are associated to a workplace space 33, and the lamp 5 and the screen 6 are associated to a home space 32. When the mobile phone 7 sends coordinates 19 to the WoT framework 20, the WoT framework 20 determines if the sent coordinates correspond to a range of coordinates associated to one of the spaces 32 or 33.

When the mobile phone 7 sends coordinates corresponding to the user home, the WoT framework sends back 21 a list of available resources comprising a semantic description of the lamp 5 and a semantic description of the screen 6. In the same manner, if the mobile phone 7 sends coordinates corresponding to the workplace, the WoT frameworks sends back the semantic description of the two printers 3 and 4.

An example of WoT framework module is described in "Providing User Support in Web of things enabled smart spaces" BOUSSARD, M. in Proceedings of Second International Workshop on Web of Things (WoT '11). ACM, New York. Afterwards, the resource getting module 18 forwards 22 the list of semantic description to the resources checker 15.

The semantic description of a resource describes the service provided by the said resource as well as additional data such as information about the owner, the location of the connected resource, the state and the usability of the connected resource. The state indicates the real operational state of the resource which informs if the resource is currently available. The state can be set to "operational", "busy" or "out of order". Furthermore, the usability defines whether the resource is shared or not. Therefore, the usability can be set to "public" so as to allow every user to access the resource, "community" so as to only allow users among a predetermined list of user or "private", which means only the owner has the access to the resource. Therefore, in the step 21 of sending the semantic description of the available resources, resources owned by the user as well as resources owned by other people are sent to the user.

The WoT framework may further determine the list of available resources as a function of the user identifier. For instance, the WoT framework compares the usability and ownership information of the resources to the user identifier. The WoT framework then sends a list comprising only private resources owned by the user, public resources, and community resources for which the user is included in the predetermined list.

An example of a semantic description is shown below and consists in the semantic description of the lamp 5.

In this semantic description, the services, which can be provided by the lamp 5, are identified by the "hasService" tags. The lamp can provide two services, which are the switching the lamp on or off, or make the blinking of the lamp 5. The additional information are identified by "owner", "state", "usability" and "location" tags and are respectively set to "ownerIdentity", "Operational", "Public" and a GPS coordinate x, y.

In the same way as the location determination of the mobile phone 7 explained above, the location of the resource may also be determined by a logical reference explicitly by the user or implicitly.

The application checker 15 analyses the list of available resources and compares the list of required services sent by the application analyzer 16 with the list of available resources provided by the resource getting module 18. More precisely, for each application of the list of required service, the application checker 15 verifies whether each of the required services of the said application has a match in the services provided by the resources of the list of available resources. Furthermore, the application checker verifies if the resource has an operational state in order to consider it as a matching resource. The application checker 15 generates a list of operational applications for which the application checker 15 finds a match for each of the required resources of the said application.

A matching service in the list of available resources may be obtained by a direct matching or a composite matching.

A direct matching means that a requested service can be supported by a service of one of the physical resources of the list of available resources. Therefore, there is an exact matching between the service requested and the available service.

A composite matching means that the required service can be supported by a combination of services of more than one available physical resource.

Therefore, the application checker 15 may determine n resources in order to provide m required services. Some of the m required services may be provided with direct matching and the other of the m required services may be provided with by composite matching services of the available resources.

The application checker 15 sends the list of operational application 16 to a ranking module 24.

The ranking module 24 calculates the relevancy score for each application of the list of operational applications, and establishes a ranked list of operational applications according to their respective calculated relevancy scores.

To this end, the Wot recommendation module 12 comprises a preference module 27. The preference module 27 contains user's preference rules, which are stored in a database of the mobile phone 7. The preference rules are provisioned 28 by the user 25 and represent the preference of the user 25 on certain value of the properties of the available resources. The user rules concern the proximity of the resource, the ownership of the resource and therefore indicate if the user 25 prefers the resources owned by himself or his company to resources owned by third parties, or if the user 25 prefers the resources which are the closest to the mobile phone 7.

The ranking module 24 accesses to the user's rules and calculates a relevancy score for each application of the list of operational applications according to the user's rules. For instance, if the user is at his workplace, an operational application would be a "Print" application which requires a printer. The semantic description of each of the printers comprises their GPS coordinates. Therefore, the ranking module 24 determines a higher relevancy score for the Print application associated to the closest printer than to the print application associated to the other printer. Turning back to FIG. 5, the first printer 3 is closer to the user than the second printer 4. In consequence, the printer application associated to the first printer 3 gets a higher score than the printer application associated to the second printer 4. Therefore, the icon representing the printer application associate the first printer 3 is displayed at the top of the screen 8. Moreover the ranking module 24 calculates the relevancy score of the applications as a function of the type of matching which was determined by the application checker 15 for a specific application. For instance, an application, operational thanks to a direct matching, gets a higher relevancy score than the same operational application obtained by a composite matching of services.

The resulting ranked list is transmitted 29 to the GUI, which displays icons according to the ranked list.

Therefore, the GUI only displays icons of applications which may fulfill their tasks. Moreover, the icons are listed according to their relevance calculated on the base of information about the resources which would be executed with the application but also on the base of the user context.

In other embodiments of the invention, the ranked list may be transmitted to a voice speech interface or any means that may propose to the end user the recommended operational applications, or another application that will process the ranked list, instead of a GUI.

Moreover, the method according to the invention may operate on any other computing device connected to the internet such as a, for instance, a smartphone, a computer or a tablet computer.

The methods described hereinabove may be executed through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

In the claims, any reference signs placed between parentheses shall not be construed as limiting the scope of the claims.

APPENDIX 1

Semantic description of the Train Warning application:

```
<?xml version ="1.0"?>
<rdf:RDF
    xmlns:rdf="http://www.w3.org/1999/02/22-rdf-syntax-ns#"
    xmlns:xsd="http://www.w3.org/2001/XMLSchema#"
    xmlns="http://www.belllabs.com/waap/application#"
    xmlns:rdfs="http://www.w3.org/2000/01/rdf-schema#"
    xmlns:owl="http://www.w3.org/2002/07/owl#"
    xml:base="http://www.belllabs.com/waap/application">
  <Application rdf:ID="metro_warning">
    <RDF:Description about="application will blink a visual resource when train is approaching to station"/>
    <HasInput>
        <FeedResource rdf:type="WoT_connected_trafic_feed"">
        </FeedResource>
    </HasInput>
    <HasInput>
        <VisualResource rdf:type="WoT_connected_object">
            <hasService>blink</hasService>
        </VisualResource>
    </HasInput>
  </Application>
</rdf:RDF>
```

Semantic description of the Lamp resource 5:

```
<?xml version ="1.0"?>
<rdf:RDF
    xmlns:rdf="http://www.w3.org/1999/02/22-rdf-syntax-ns#"
    xmlns:xsd="http://www.w3.org/2001/XMLSchema#"
    xmlns="http://www.belllabs.com/waap/wot_resource#"
    xmlns:rdfs="http://www.w3.org/2000/01/rdf-schema#"
    xmlns:owl="http://www.w3.org/2002/07/owl#"
    xml:base="http://www.belllabs.com/waap/wot_resource">
<WoT_Resource rdf:ID="Lamp1" rdf:type="#WoT_Object">
    <Owner>ownerIdentity</Owner>
        <hasFriendlyName>lamp at home</hasFrendlyName>
        <Services>
            <hasService>
                <name>switch_on/off</name>
            </hasSrevice>
            <hasService>
                <name>blink</name>
                <color rdf:type="#color">red</color>
                <default_frequency>10</default_frenquency>
            </hasService>
        </Services>
        <Location>
            <locationType>GPS</locationType>
            <locationValue>
                <longitude>x</longitude>
                <latitude>y</latitude>
```

```
        </locationValue>
      </Location>
      <State>Operational</State>
      <Usability>Public</Usability>
    </WoT_Resource>
</rdf:RDF>
```

The invention claimed is:

1. A computer implemented method of filtering executable applications in a computing device, the device comprising a memory and a collection of executable applications stored in the memory, wherein the computing-device is connected to a network, the method comprises:
   determining for each application of the collection of applications a list of services required by the respective application to be executed by the user,
   determining a position of the computing device,
   retrieving, as a function of a position of the computing device a collection of available physical resources of the network as the physical resources able to be accessed by the computing device through the network, a physical resource being provided by a physical object near the position, comprising a communication interface adapted to receive instructions from the computing device and being able to provide a service in response to said instructions, wherein each physical resource is associated to a specific location, and wherein the collection of available physical resources is retrieved as a function of the distance between the location of the computing device and the associated specific locations,
   comparing the list of services required by each application with the services provided by the collection of available physical resources so as to find a match for each required service of the list of the said application within the services provided by the collection of available physical resources,
   generating a list of operational applications, wherein an operational application is an application for which each required service has a match in the services provided by the collection of available physical resources; and
   configuring a graphical user interface to control execution of the applications as a function of the list of operational applications, and display the operational applications of the list of operational applications as graphical elements adapted each one to execute a respective operational application, wherein the configuration of the graphical element of the graphical user interface is made as a function of computed relevancy scores, and wherein the graphical elements are displayed according to the relevancy score of their respective operational application, wherein relevancy scores are based at least on location and operational application matching.

2. The method according to claim 1, wherein the method further comprises:
   computing a relevancy score for each operational application of the list of operational applications; and
   ranking the list of operational application according to the relevancy scores, the operational applications corresponding to the highest relevancy scores being set at the top of the list.

3. The method according to claim 2, wherein the retrieval of the collection of available physical resources comprises:
   retrieving a description for each available physical resource, the description comprising individual indications representing properties of the associated available physical resource; and
   computing a relevancy score is a function of said individual indications of the available physical resource.

4. The method according to 3, wherein the individual indications comprise at least one indication selected among location indications representing the location of the available physical resource, ownership indications representing the ownership of the physical resource, status indications representing the operational status of the physical resource and usability indications representing the usability of the physical resource.

5. The method according to claim 3, wherein the method further comprises accessing a user preferences rule, the user preferences rule representing the preference of a user for a preferred value associated to an indication of said individual indications, computing a relevancy score further being made as a function of the user preferences rule so that an operational application, associated to the preferred value, has a higher score than an operational application not associated to the preferred value.

6. The method according to claim 1, wherein comparing the list of services required by the application with the collection of available physical resources further comprises finding one physical resource providing a required service or combining at least two available physical resources to find a match for one required service of the list of required services.

7. The method according to claim 1, wherein the retrieval of the collection of available physical resources comprises retrieving a description for each physical resource of the list of available physical resources, the description of the physical resource comprising a service indication which represents a service which can be provided by the said physical resource, comparing the services includes analyzing the description of the available physical resource so as to identify the services which can be provided.

8. The method according to claim 1, wherein the memory comprises an original set of applications including the collection of applications, the method further comprising pre-filtering the original set of applications so as to obtain the collection of applications, pre-filtering being made as a function of context information determined by the computing device.

9. An apparatus comprising:
   at least one processor;
   at least one memory including computer program code;
   the at least one memory and the computer program code configured to, with the at least one processor, cause the apparatus at least to perform:
   determining for each application of the collection of applications a list of services required by the respective application to be executed by the user;
   a position of the apparatus;
   retrieving, as a function of a position of the apparatus, a collection of available physical resources of the network as the physical resources able to be accessed by the computing device through the network, a physical resource being provided by a physical object near the position, comprising a communication interface adapted to receive instructions from the computing device and being able to provide a service in response to said instructions, wherein each physical resource is associated to a specific location, and wherein the collection of available physical resources is retrieved as a function of the distance between the location of the computing device and the associated specific locations;

comparing the list of services required by each application with the services provided by the collection of available physical resources so as to find a match for each required service of the list of the said application within the services provided by the collection of available physical resources; and generating a list of operational applications, wherein an operational application is an application for which each required service has a match in the services provided by the collection of available physical resources; memory coupled to the processor; and a graphical user interface, wherein the graphical user interface is configured to control execution of the applications as a function of the list of operational applications, and display the operational applications of the list of operational applications as graphical elements adapted each one to execute a respective operational application, wherein the configuration of the graphical element of the graphical user interface is made as a function of computed relevancy scores, and wherein the graphical elements are displayed according to the relevancy score of their respective operational application wherein relevancy scores are based at least on location and operational application matching.

10. The apparatus as set forth in claim 9, wherein the apparatus comprises: a non-transitory computer readable medium with computer program code.

* * * * *